United States Patent [19]
Burchell et al.

[11] Patent Number: 5,768,767
[45] Date of Patent: Jun. 23, 1998

[54] AUTOMATIC HANDLE APPLICATOR

[75] Inventors: V. Howard Burchell, Howell; Gary B. Baker, Manchester, both of Mich.

[73] Assignee: Schmalbach-Lubeca AG, Ratingen, Germany

[21] Appl. No.: 717,917

[22] Filed: Sep. 23, 1996

[51] Int. Cl.$^6$ .............................. B23P 21/00; B23P 19/02
[52] U.S. Cl. .................................. 29/774; 29/235; 29/785
[58] Field of Search ............................. 29/774, 235, 785, 29/773, 789, 792, 797

[56] References Cited

U.S. PATENT DOCUMENTS

| | | | |
|---|---|---|---|
| 1,629,599 | 5/1927 | Tevander . | |
| 2,178,429 | 10/1939 | Lowry . | |
| 2,193,128 | 3/1940 | Gammeter . | |
| 2,340,211 | 1/1944 | Balsley et al. . | |
| 2,846,835 | 8/1958 | Aguilar et al. . | |
| 3,036,371 | 5/1962 | Gray et al. . | |
| 3,347,083 | 10/1967 | Turpin et al. . | |
| 3,407,564 | 10/1968 | Randrup | 29/773 |
| 4,236,305 | 12/1980 | Hetherington et al. | 29/774 |
| 4,523,377 | 6/1985 | Spletzer et al. | 29/773 |
| 4,532,690 | 8/1985 | Del Bon et al. | 29/235 |
| 4,653,182 | 3/1987 | Fukuda et al. | 29/785 |
| 4,726,535 | 2/1988 | Snyder | 29/235 |
| 5,275,681 | 1/1994 | Hettler . | |
| 5,412,859 | 5/1995 | Hubbs et al. . | |
| 5,467,527 | 11/1995 | Zanini et al. | 29/785 |
| 5,471,814 | 12/1995 | Ruckdschel . | |

Primary Examiner—S. Thomas Hughes
Assistant Examiner—Tisa Stewart
Attorney, Agent, or Firm—Harness, Dickey & Pierce, P.L.C.

[57] ABSTRACT

A handle applicator for applying a handle having an attachment ring onto a neck of a container by expanding the ring as the ring is being applied. The applicator includes a plurality of circumferentially positioned arms each having a distal end. The arms are moveable between a radially outward first position and a radially inward second position. In the second position, the arms generally define a diameter over which the ring can be positioned onto the arms. The arms also each include a ramp surface and these surfaces cooperate to define a frusto-conical shape when the arms are in the first position. The applicator also includes a plurality of fingers that are generally located radially outward from the arms and which are being biased such that arm contacting portions of the fingers contact the arms. The fingers are movable toward and away from the distal ends of the arms so that the arm contacting portions will engage and push a ring located on the arms up the ramp surfaces. This expands the ring and further pushing by the fingers causes the ring to be pushed off of the arms allowing the ring to contract into retaining engagement onto the neck of the container.

29 Claims, 6 Drawing Sheets

AUTOMATIC HANDLE APPLICATOR

BACKGROUND OF THE INVENTION

1. Field of the Invention

The present invention generally relates to the positioning of a ring member onto an article. More specifically, this invention relates to an apparatus for expanding the attachment ring of a plastic handle and applying the handle to the neck of a plastic container. The above is achieved by expanding the ring as the ring is being forced onto the container neck.

2. Discussion of the Prior Art

Various devices have been developed for applying ring-like members onto various articles. Such devices often involve the placement of an annular biasing member around the structure or the insertion of an O-ring into a circumferential groove. Another instance where a ring member is positioned on an article, is the application of a ringed handle onto the neck of a bottle or container. Typically these containers are plastic containers of a relatively large size, one gallon for example, and are used to hold a liquid product, such as juice. Many consumers, and in particular those with small children, prefer these large containers because of the economy offered in purchasing the product. A drawback, however, to such large containers is the resulting difficulty with which they are carried and handled. Obviously, a container of this size cannot be grasped about its body with one hand for either carrying or pouring.

In order to alleviate the above problems, it has previously been devised to provide plastic handles on these large containers. The handles readily allow the containers to be carried with one hand. They do not, however, necessarily allow the container to be poured with one hand.

One prior variety of handled container has a handle integrally formed with the container. Preforms which are subsequently blow molded to form these containers are generally formed by an extrusion molding process and, as a result, this limits the nature of the material which can be used to form the container. When the container is formed from an injection molded preform (which is most often polyethylene terephthalate (PET), polyethylene napthalate (PEN), polyolefin or other similar materials), the nature of the material, shape of the preform the and steps of the blow molding process prevent the formation of a blow molded handle with the container body. Some prior designs have alternatively used handle inserts which are positioned in the blow mold before molding. Others have adopted the process of applying the handles after the formation of the container. It is to this later type of container which the present invention has particular applicability.

U.S. Pat. No. 3,036,371 discloses a hand press for applying handles to containers. This patent discloses the method by which a handle having an attachment ring is mounted onto the neck of a container. Basically, a cone is placed over the mouth of the container, the ring of the handle is placed on the small end of the cone, a chuck is lowered to engage behind the ring, and downward movement of the chuck pushes against the ring forcing the ring over the larger end of the cone to expand the ring. Continued movement of the chuck pushes the ring off of the end of the cone and over a rib or lip on the neck of the container where the ring contracts generally into its pre-expanded shape and is retained on the container.

One drawback of the above device is that it is labor intensive. It is also relatively slow in that an individual is required to locate the ring on the cone portion and operate the handle applicator. Other devices have been seen where the handle applicator applies the handle to the container automatically, but the rings themselves must be manually positioned on the applicator.

In view of the above and other limitations of the prior art, it is an object of the present invention to provide a fully automated handle applicator.

It is also an object of the present invention to provide a handle applicator which receives and discharges handles from the same end of the applicator.

A further object of this invention is to provide a handle applicator which is relatively simple in construction yet extremely reliable in its operation.

It is also an object of this invention to provide an apparatus capable of operating at a cycle time as fast or faster than the cycle time for forming the containers to which the handles are being applied.

SUMMARY OF THE INVENTION

The above and other objects are accomplished by providing a fully automated handle applicator in the production line of the container. The applicator is intended to apply the attachment ring of a plastic handle onto the neck of a blow molded plastic container and it applies the handles by forcibly expanding the ring as it is urged onto the neck of the container. The applicator itself includes a handle driver having a plurality of arms. The arms are moveable between a first, increased diameter position and a second, decreased diameter position. In the first diameter position, the distal end of the arms defines a diameter which is greater than the inner diameter of the attachment ring. A slide member located within the body is axially actuated to cause simultaneous movement of the arms between their first and second positions. In the second position, the arms have collapsed radially inward and define an effective diameter which allows the arms of the applicator to enter the attachment ring of the handle. The slide member is again actuated causing the arms to move back into their first position. The arms include a ramp surface which, when the arms are in the first position, generally cooperate with one another to define a frusto-conical shape which is divergent in a direction toward the distal ends of the arms. When in the first position, the ramp surface of the arms accordingly operates to retain a ring on the driver.

The distal end of the driver itself includes a pilot member that fits within the mouth of a container. With the mouth of the container located over the pilot, the distal ends of the arms engage a lip or retaining collar formed on the neck of the container. From this it is seen that the interior surfaces of the arms and the exterior surfaces of the pilot cooperate to define an annular receiving space for the neck of the container. The engagement of the distal ends of the arms with the retaining collar of the container positively locates the depth at which the handle is applied to the container.

With the driver engaging a container, a set of fingers engage behind the ring. The fingers slide on the arms and are moveable so as to push the ring up the ramp surfaces of the arms. As the ring is pushed up the ramped surfaces, the ring is forced to radially expand to a diameter which is greater then the retaining collar. Continued axial movement of the fingers pushes the ring off of the ends of the arms, over the retaining collar and onto the neck of the container. Having been disengaged from the arms, the ring of the handle contracts generally into its pre-expanded shape (which is slightly less or substantially the same as the diameter of the neck adjacent to the retaining collar). The driver then withdraws from the container as the container proceeds to a subsequent processing station.

With the handle applied to the container as described above, the handle portion of the handle generally extends to one side of the container. When not in use, the handle portion is kept away from the mouth of the container and it will not interfere with the pouring of the contents from the container. In order to lift the container, one merely grasps the handle portion and its resilient nature allows it to flex upward above the mouth of the container suspending the container stably below it.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
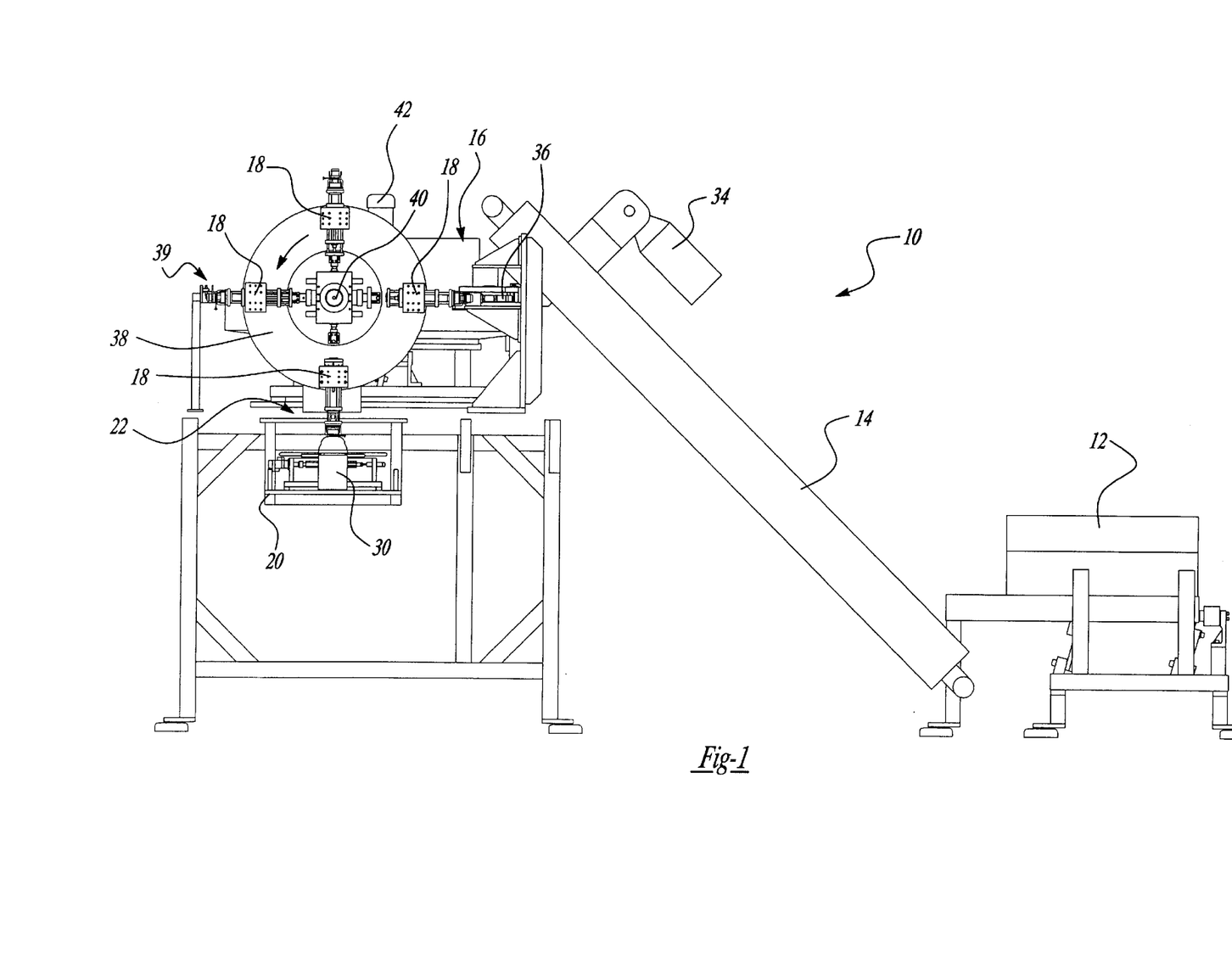
FIG. 1 is a side elevational view of a handle applicator embodying the principles of the present invention.

Referring now to FIG. 1, shown therein is an apparatus, generally referred to as a handle applicator and designated at 10, for applying handles 24 onto containers 30 by expanding an attachment ring portion 26 of the handle 24 as it is applied onto the neck 32 of the container 30. The applicator 10 generally includes a source of handles 12, a handle conveyor 14, a loading station 16, a plurality of handle drivers 18, a container conveyor 20 and an applying station 22.

Figure 6:
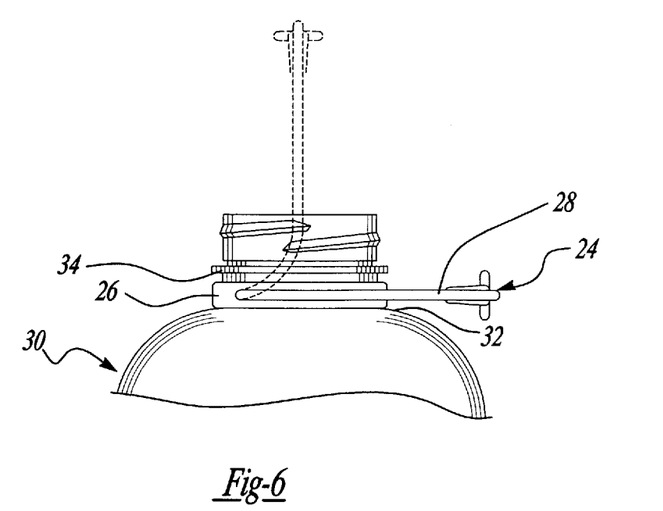
FIG. 6 is a partial view of a container having a handle applied thereto.

The handles 24 themselves include the attachment ring 26 mentioned above and an integrally formed handle portion 28. The attachment ring 26 secures the handle 24 to a container 30 and, accordingly, the ring 26 has an inner diameter which is substantially the same as or less than the outer diameter of the neck 32 of the container 30. The handle portion 28 is generally U-shaped with a pair of legs that are attached to the ring 26 at generally opposed locations on the ring 26. The handle 24 is formed so that when mounted to the container 30, the handle portion 28 extends to the side of the container 30 where it will not interfere with the pouring of the contents from the container 30. To carry the container 30, the handle portion 28 is grasped and, as the result of the weight of the container 30, the handle portion 28 flexes upward until located above the container 30, generally 90° relative to the ring 26. This is generally seen in FIG. 6.

From the handle source 12, the handles 24 are fed to the handle conveyor 14 which is an elevator suitable for raising the handles 24 to a vibratory bowl and an in-line vibratory feeder. The feeder coveys the handles 24 to the handle loading station 16 (the details of which are not specifically illustrated) where the handles 24 are suspended by the handle portions 28. If not properly oriented when provided to the in-line feeder, the handles 24 are not accepted onto the feeder and, instead are returned to the vibratory bowl. As further discussed below, the handles 24 are individually received over and onto the arms 60 of the handle driver 18. The actual mechanism by which the handles 24 are oriented is not specifically shown herein, it being understood that a wide variety of such mechanisms could be utilized as will be readily appreciated by those skilled in the art.

The handle drivers 18 are mounted to a vertically oriented indexing table 38 that rotates about a horizontal axis 40. Indexing of the table 38 is controlled by an electric motor 42 or other suitable mechanism. Depending on the number of drivers 18 mounted to the table 38, the table 38 is indexed by the motor 42 through a corresponding number of positions. In the illustrated embodiment, four drivers 18 are mounted to the table 38 and, accordingly, the motor 42 indexes the table 38 through four positions. As referred to herein, the position of the handle driver 18 located at three o'clock on the table 38 is referred to as the loading position. The position of the handle driver 18 located at the six o'clock position on the table 38 is the applying position.

In FIG. 1 it can also be seen that table 38 rotates in a counterclockwise manner such that the handles 24 are applied to the drivers 18 at the loading station 16, are then moved through a non-working station (located at twelve o'clock on the table 38), a checking station 39 (located at nine o'clock on the table 38) and are then rotated to the applying position where the handles 24 are discharged from the driver 18 and applied to the container 30.

At the checking station 39, the driver 18 is checked to determine if a handle 24 was received thereon at the loading station 16. If no handle 24 is found on the driver 18, the apparatus 10 will skip that driver 18 when it is located in the applying station 22 and the container 30 will be retained until the next driver 18 carrying a handle 24 has been indexed to the applying station 22. In this manner, it is ensured that no container 30 advances through the apparatus 10 without receiving a handle 24 thereon.

The containers 30 are brought to the applying station by the container conveyor 20. This conveyor 20 is only partially and generally illustrated in FIG. 1 for the sake of clarity and because persons skilled in the art to which the present invention relates will understand that such conveyor systems are well known and readily available or buildable. Generally, the only specific requirement of the conveyor 20 is that it individually provides containers 30 to the applying station at intervals corresponding to the indexing of the table 38. From the applying station, the containers 30 are transported by the conveyor 20 for further processing steps. These steps might include filling, capping, labeling and shipping of the containers 30. Alternatively, the first three of these steps may be performed before the container 30 is received at the apparatus 10.

Referring now to FIGS. 2–5, the handle driver 18 and its operation will now be described in particular detail. The driver 18 includes a base 40 which attaches the driver 18 to the indexing table 38. Mounting bores 42 are formed in the base 40 allowing for securement to the table 38 by fasteners such as screws (not shown).

The driver 18 includes a main cylinder or body 44 which is appropriately supported for axial movement relative to the base 40. The main body 44 is positioned such that opposing ends of the main body 44 are located on opposite sides of the base 40. A platen 46 is secured to one end of the main body 44 and a pair of coil springs 48, which extend into bores 50 defined in the base 40, act on the platen 46 to bias the main body 44 in what is herein referred to as a rearward direction and designated by arrow 52.

The opposing end of the main body 44 includes a head 54. At the distalmost end of the head 54 is a pilot 56 that is inserted into the neck 32 of the container when a handle 24 is being applied thereto. Formed in the head 54 generally at equidistantly spaced locations therearound are a series of slots 58, preferably four to six, and received within each slot 58 is an arm 60.

The arms 60 are mounted in the slots 58 for rocking movement about a transverse pivot 62 located between a distal end 64 and a proximal end 66 of the arms 60. Between the distal end 64 and the pivot 62 of each arm 60 is a series of surfaces, one of which defines a ramp surface 68 that diverges in the direction of the distal end 64 and provides an inclined transition between an outboard surface 70 and an inboard surface 72.

Figure 2:
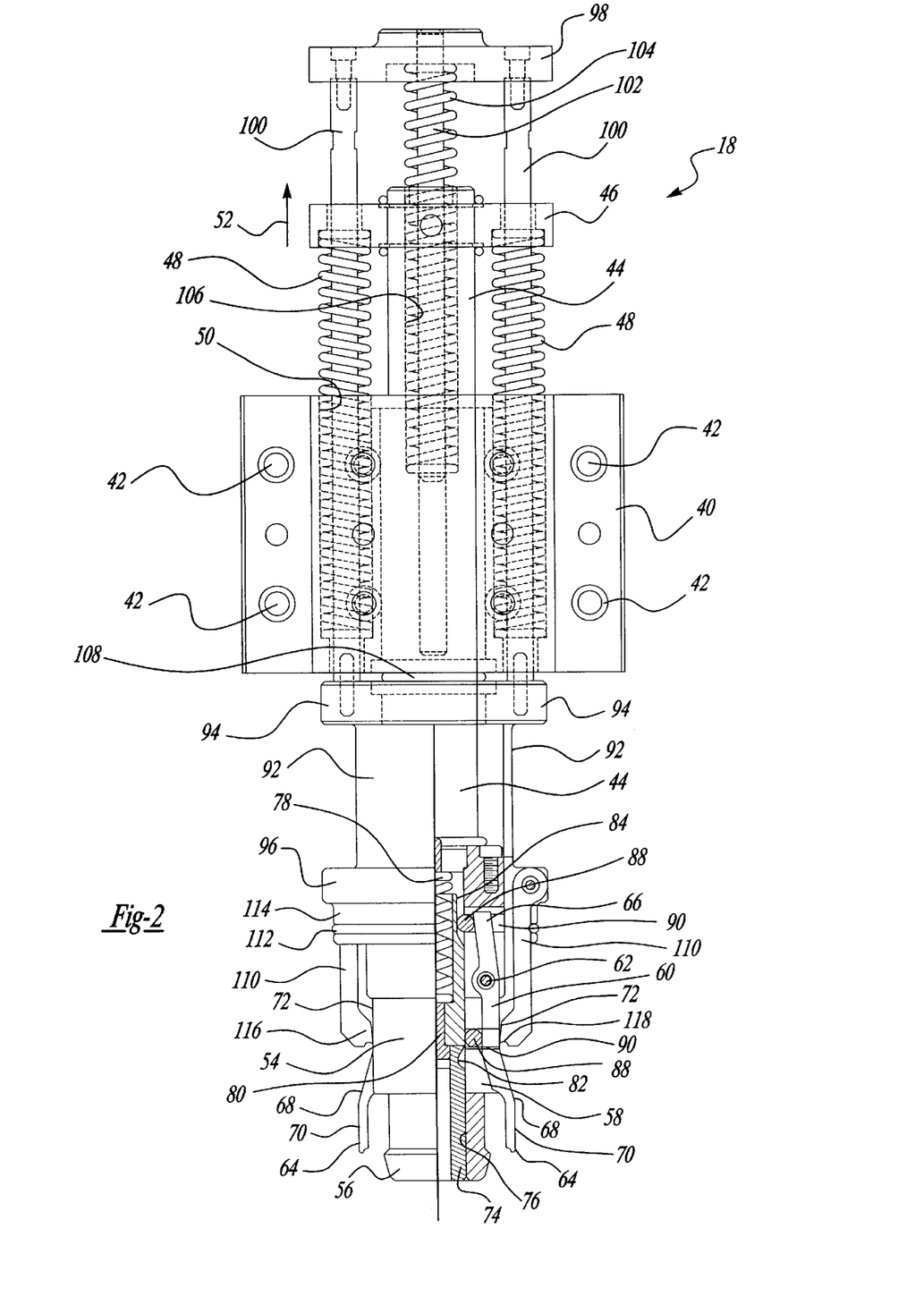
FIG. 2 is a top plan view of a handle portion of the applicator illustrating the arms in their radially outward position.
Figure 3:
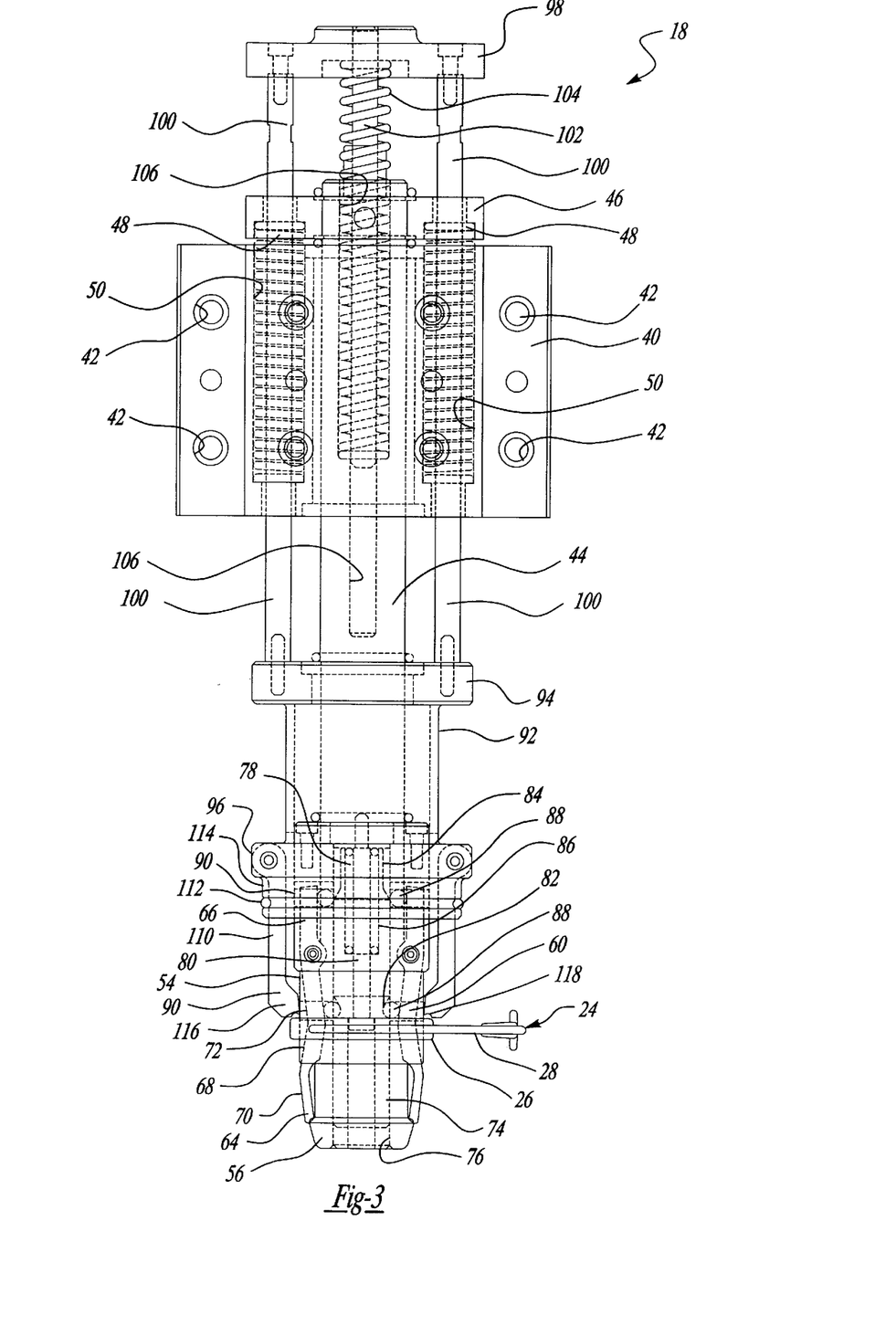
FIG. 3 illustrates the handle driver with the arms in a radially contracted position and with a handle loaded thereon.

As a result of their pivotable mounting within the head 54, the arms 60 are moveable between a first position, seen in FIG. 2, and a second position, seen in FIG. 3. In the first position, the distal ends 64 of the arms 60 are located in radially expanded position and their outboard surfaces cooperate to effectively define a first diameter. In their second position, the distal ends 64 of the arms are located in a radially contracted position and the arms 60 accordingly define a second diameter which is less than the first diameter. Notably, this second diameter is slightly less than the inner diameter of the ring 26 and the outer diameter of the head. The exterior surfaces 68, 70, 72 of the arms 60 are preferably arcuate in the circumferential direction and this assists the arms 60 in conforming to the inner diameter of the ring 26.

To effectuate movement of the arms 60 between their first and second positions, a slide member 74 is moveably received within a bore 76 defined through the head 54. As seen in the figures, the opposing ends of the slide member 74 are cored out and the proximal end of the slide member receives a coil spring 78 therein. A stop pin 80 inserted through the cored out distal end of the slide member 74 passes through a bore in the side member 74, through the center of the coil spring 78 and is fastened to the main body 44. The slide member 74 is axially moveable along the pin 80 and as such, the pin 80 limits the distance which the spring 78 can bias the slide member 74.

The exterior surface of the slide member 74 is formed with a pair of recesses which are herein referred to as the distal recess 82 and the proximal recess 84. The recesses 82, 84 are recessed relative to both a common exterior surface 86 of the slide member 74 and the interior surface of the head 54. Both recesses 82 and 84 are formed with ramp surfaces that provide a transition or incline up to the common exterior surface 86.

Interacting with the recesses 82 and 84, as well as with the common exterior surface 86, are a pair of roller elements 88 for each arm 60. The roller elements 88 are received and axially retained in transverse grooves 90 formed in the head 54. The grooves 90 allow the roller elements to radially move relative to the slide member 74 and the head 54. Interaction between the roller elements 88, the slide member 74 and the arms 60 is more fully described below.

Mounted for axial movement over the main body 44 and the head 54 is a collar 92 that includes a rear flange 94 and a forward flange 96. The rear flange 94 is connected to a platen 98 by a pair of rods 100 that extend centrally through the coil springs 48 and the bores 50 defined in the base 40. Extending forward off a central position of the platen 98 is a pin 102 over which is located a coil spring 104. The pin 102 and spring 104 are received within a countersunk bore 106 defined in the main body 44. Accordingly, the spring 104 operates to bias the collar 92 in the rearward direction as indicated by arrow 52. The extent of this biasing is limited by engagement of the rear flange 94 with the base 40. A resilient member 108, such as an O-ring, is provided to cushion contact between the base 40 and the collar 92.

Pivotally mounted to the forward flange 96 of the collar 92 are a series of fingers 110, the number which corresponds to the number of arms 60. The fingers 110 are located on the collar 92 such that each finger 110 corresponds with an arm 60 and a resilient member 112, positioned in a groove around an extension 114 of the collar 92, acts to bias the fingers 110 radially inward so that a distal end 116 of the fingers 110 is in contact with the arm 60. Since the fingers 110 are biased radially inward by the resilient member 112, as the collar 92 axially moves relative to the head 54, the fingers 110 remain in sliding contact with the exterior surfaces 68, 70, 72 of the arms 60.

In order to operate the various mechanisms of the driver 18, pneumatic, electromechanical or hydraulic control systems can be employed. Preferably, pneumatic or electromechanical systems are utilized because they provide a clean working environment suitable for the containers 30. The specific pneumatic or electromechanical mechanisms which are utilized to move the various components of the driver 18 are not set out in detail herein since the construction of such features into the driver 18 and the present applicator apparatus 10 will be readily apparent to those skilled in the art.

During operation and use, the driver 18 is initially provided as seen in FIG. 2 with the arms 60 located in their first position. The main body 44, including the head 54 and pilot 56, is moved forward to engage the in-line feeder 36. Simultaneously or substantially simultaneously therewith, at the loading station, the slide member 74 is moved rearward so that one of two roller elements 88 drops into the distal recess 82 while the other roller element 88 moves out of the proximal recess 84 and onto the exterior surface 86. As a result, the arm 60 is moved into its second position as seen in FIG. 3. While the arms 60 are in this collapsed, second position, the main body 44 (including the head 54 and pilot 56) and the collapsed arms 60 are moved forward to engage a ring 26 of a handle 24 being carried by the in-line feeder 36. The feeder 36 generally holds the rings stationary and once the collapsed arms 60 have been advanced through the ring 26, including the outboard surfaces 70 and ramp surfaces 68, the slide member 74 is then moved axially forward, causing the rear roller 88 to move off of the exterior surface 86 and into the proximal recess 84 as the forward roller 88 moves out of the distal recess 82 and onto the exterior surface 86. The arms 60 are accordingly returned to their outboard, first position. This movement of the arms 60 allows the ramp surfaces 68 to retain the ring 26 and handle 24 on the driver 18. This can be seen in FIG. 4. The main body 44 and arms 60 are then withdrawn from the loading station 16 thereby "picking" and handle 24 from the feeder 36.

Figure 4:
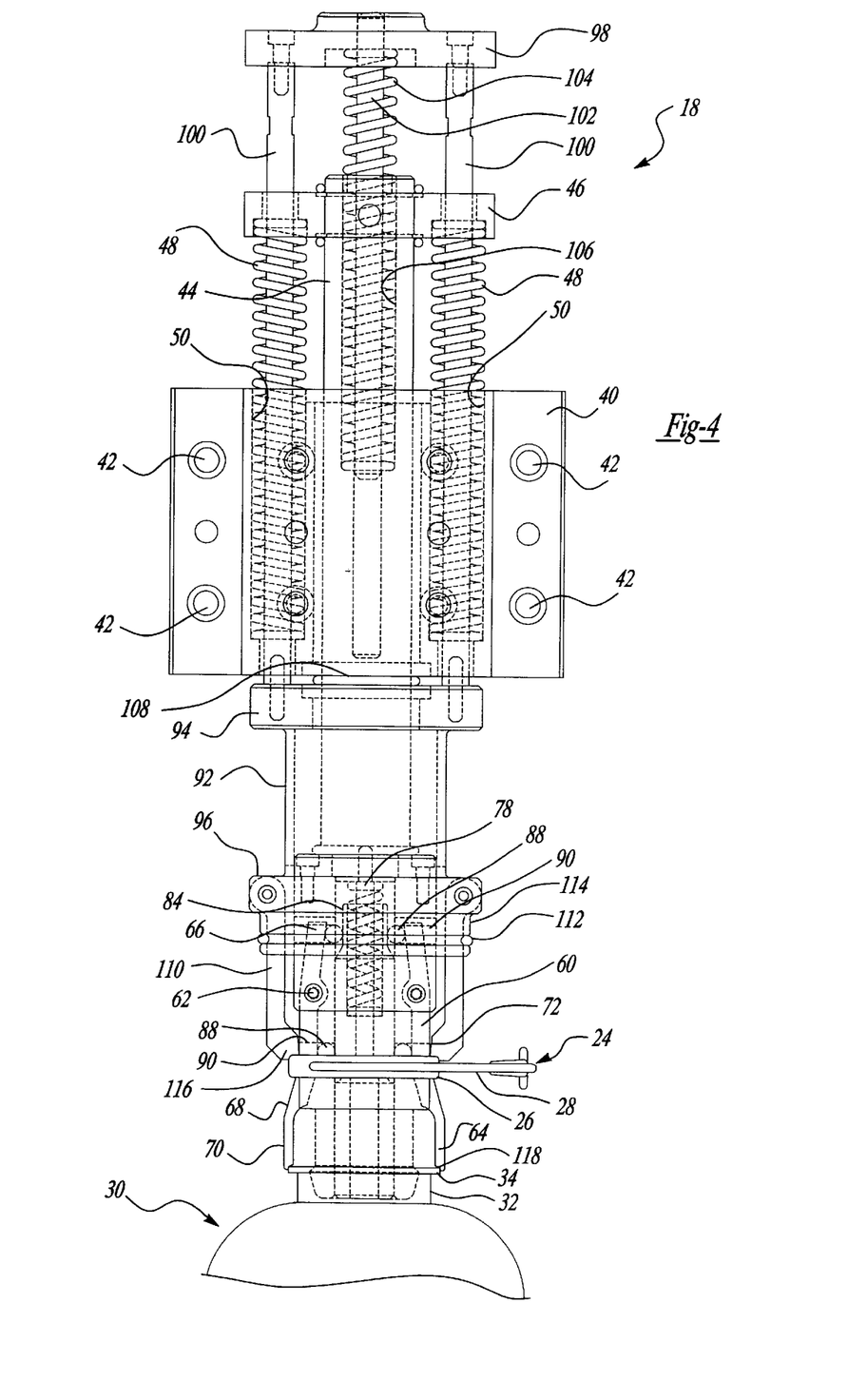
FIG. 4 illustrates the handle driver with its arms moved into a radially outward position retaining the handle thereon and engaging a container.

Also seen in FIG. 4 is a lip 118 on the distal end 116 of the fingers 110. This lip 118 engages behind the ring 26 of the handle 24.

Figure 5:
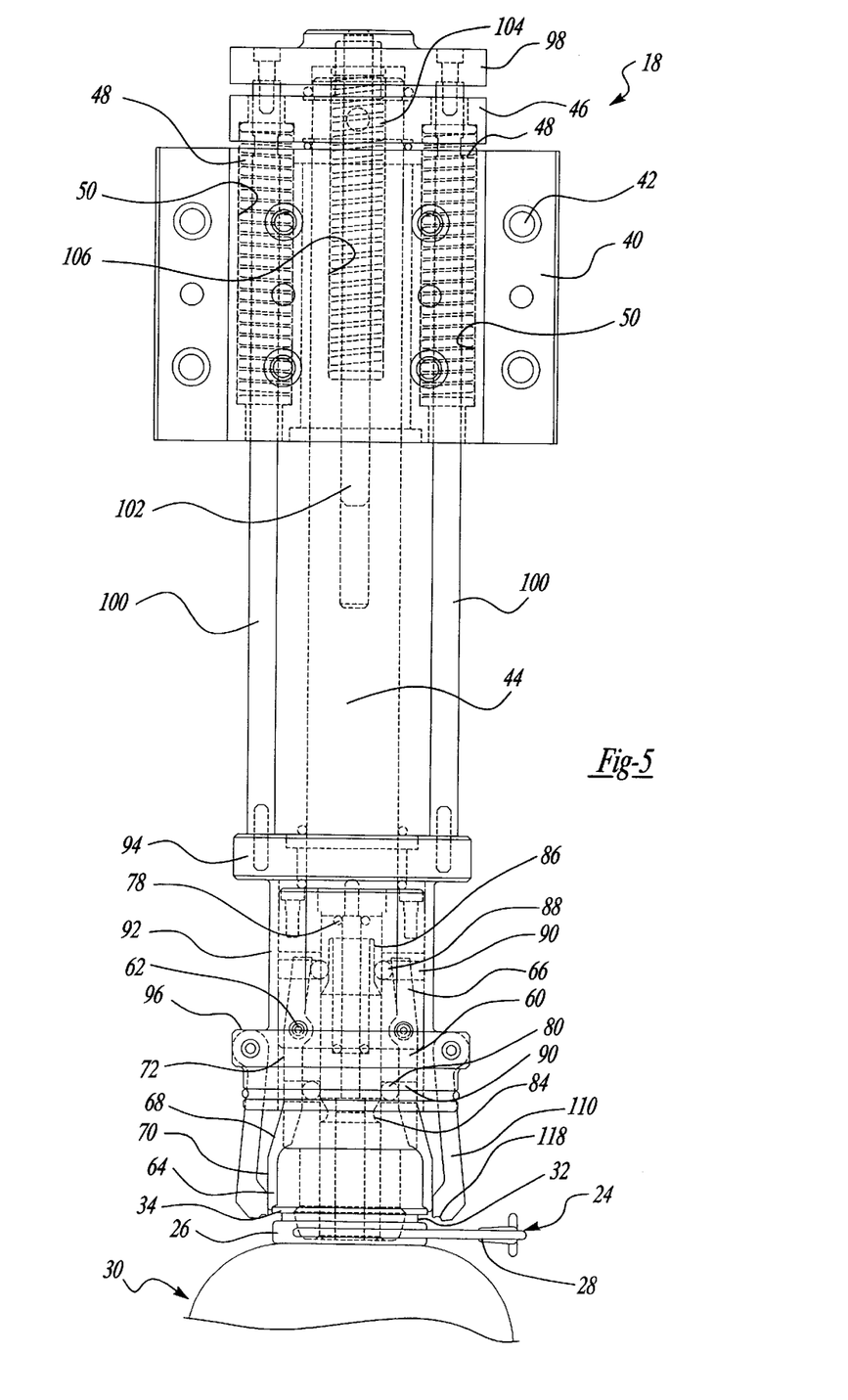
FIG. 5 illustrates the handle driver after axial movement of the fingers and positioning of the handle onto the neck of the container.

The driver 18 is then indexed by the table 38 until arriving at the checking station 39. If a handle 24 is found to be on the driver 18 at the applying station 22, which is generally seen in FIGS. 4 and 5, the main body 44 is again advanced such that the pilot 56 enters into the neck 32 of the container 30 as the neck 32 is received in the annular space defined between the pilot 56 and the arms 60.

Once the container 30 is firmly sealed in this manner, the collar 92 is advanced causing the fingers 110 to push the ring 26 up the ramp surfaces 68 on the arms 60 thereby expanding the diameter of the ring 26. The collar 92 continues to be advanced so that the ring 26 slides onto the outboard surface 70 of the arms. At this point, as the collar 92 and fingers 110 are further advanced, the ring 26 is pushed off of the distal ends 64 of the arms 60 and over the retaining collar 34 of the container 30. Once off of the arms 60, the ring 26 of the handle 24 contracts to near its original shape resulting in the ring 26 being securely engaged around the neck 32 of the container 30 with the retaining collar 34 preventing the ring 26 from pulling off. The various elements of the driver 18 are then retracted and the table 38 indexes the driver 18 to the loading station where the process repeats itself.

As can be seen from the above discussion, the apparatus of the present invention eliminates the need for an operator to either load handles 24 onto the driver 18 or to cause application of the handles 24 onto the containers 30. The nature of the invention is such that handles 24 can actually be applied to containers 30 at a rate which exceeds the cycle times for molding of containers of these sizes, approximately three to five seconds.

While the above description constitutes the preferred embodiment of the present invention, it will be appreciated that the invention is susceptible to modification, variation and change without departing from the proper scope and fair meaning of the accompanying claims.

We claim:

1. A handle applicator for applying a handle having an attachment ring onto a neck of a container by expanding the ring as the ring is being applied, said applicator comprising:

a plurality of circumferentially positioned arms each having a distal end, said arms being moveable between a radially outward first position and a radially inward second position, in said second position said arms generally defining a reduced diameter relative to said first position to enable a ring to be positioned about said arms and over said distal end, said arms including ramp surfaces cooperating to define a frusto-conical shape when said arms are in said first position;

a plurality of fingers generally located radially outward from said arms, said fingers being biased toward said arms, said fingers being radially and axially moveable between first and second finger positions, said fingers being located away from said distal ends of said arms when in said first finger position, said fingers being located adjacent to said distal ends of said arms when in said second finger position;

a main body supporting said arms and said fingers; and whereby with said arms in said first position said fingers engage and push a ring on said arms up said ramp surfaces thereby expanding the ring and further pushing the ring over and off of said distal ends of said arms such that the ring contracts into retaining engagement onto the neck of the container.

2. An applicator as set forth in claim 1 wherein said arms are pivotably mounted to said main body and radially moveable between said first and second positions.

3. An applicator as set forth in claim 1 wherein said arms include an inboard surface and an outboard surface separated by said ramp surfaces.

4. An applicator as set forth in claim 3 wherein said inboard and outboard surfaces are concentric.

5. An applicator as set forth in claim 1 further comprising a collar being axially moveable relative to said arms, said fingers being pivotably engaged and moveable with said collar.

6. An applicator as set forth in claim 1 wherein a portion of said fingers are in sliding surface-to-surface contact with an exterior surface of said arms.

7. An applicator as set forth in claim 1 wherein said fingers correspond in number to said arms.

8. An applicator as set forth in claim 1 wherein said fingers correspond in location to said arms.

9. An applicator as set forth in claim 1 further including a slide member located centrally between said arms, said slide member being axially moveable and cooperating with said arms to cause said arms to move between said first and second positions.

10. An applicator as set forth in claim 9 wherein said slide member includes at least one recess formed in an exterior surface of said slide member, said at least one recess located to interact with one end of said arms, said arm interacting with said at least one recess during movement of said slide member such that said arm rocks about said pivot and moves said arms and said distal ends thereof between said first and second positions.

11. An applicator as set forth in claim 10 wherein at least one roller element engages said arm and said at least one recess during movement of said slide member, said roller element causing movement of said arm between said first and second positions as said roller element moves relative to said exterior surface.

12. An applicator apparatus for applying a handle onto a container by expanding an attachment ring of the handle as the ring is being applied over a neck of the container, said apparatus comprising:

at least one handle driver including a plurality of circumferentially positioned arms each having a distal end, said arms being moveable between a radially outward first position and a radially inward second position, in said second position said arms generally defining a reduced diameter relative to said first position and over which the ring can be positioned onto said arms, said arms including ramp surfaces cooperating define a frusto-conical shape when said arms are in said first position;

a plurality of fingers generally located radially outward from said arms and being biased toward said arms, said fingers being moveable between a first finger position located away from said distal end of said arms and a second finger position located generally adjacent to said distal end of said arms, said first finger position being radially inward of said second finger position;

a main body supporting said arms and said fingers;

carrier means having said driver mounted thereto, said carrier means for moving said driver between a loading position where handles are loaded onto said driver and an applying position where handles are applied to containers;

a loading station including loading means for loading the handle onto said driver over said distal ends of said arms when said driver is in said loading position;

handle conveyor means for transporting handles from a handle source to said loading station;

an applying station where handles are applied to container by said driver, said arms being in said first position at said applying station and said fingers moving from said first finger position to said second finger position thereby pushing a ring located about said arms up said ramp surfaces to expand the ring and push the ring off of said distal ends of said arms wherein the ring contracts into retained engagement onto the neck of the container; and container conveyor means for transporting containers from a container source to said applying station.

13. An apparatus as set forth in claim 12 wherein said arms are pivotally moveable between said first and second positions.

14. An apparatus as set forth in claim 12 wherein said arms include a pair of coaxial surfaces separated by said ramp surfaces.

15. An apparatus as set forth in claim 12 wherein said fingers are pivotably moveable for movement between said first and second finger positions.

16. An apparatus as set forth in claim 12 wherein a portion of said fingers are in sliding surface-to-surface contact with said arms.

17. An apparatus as set forth in claim 12 wherein said apparatus includes at least two of said drivers.

18. An apparatus as set forth in claim 17 wherein said carrier means includes an indexing table with means for rotating said table and said drivers between said loading and applying positions.

19. An apparatus as set forth in claim 17 wherein said indexing table rotates about a horizontal axis.

20. An apparatus as set forth in claim 19 wherein said applying station is located at a lowermost position of rotation of said indexing table.

21. An apparatus as set forth in claim 12 wherein said apparatus includes four of said drivers.

22. An apparatus as set forth in claim 12 wherein said arms are pivotably supported for movement between said first and second positions and include a proximal end located opposite from said distal end with a pivot axis therebetween.

23. An apparatus as set forth in claim 22 further including a slide member located centrally between said arms, said slide member being axially moveable and interacting with said arms to cause said arms to move between said first and second positions.

24. An apparatus as set forth in claim 23 wherein said slide member includes a first recess formed in an exterior surface of said slide member, said first recess cooperating with one end of said arms during movement of said slide member such that said arms pivot about said pivot and move said arms and said distal ends between said first and second positions.

25. An apparatus as set forth in claim 24 wherein a first roller element engages said arm and said first recess during movement of said slide member causing movement of said arm between said first and second positions.

26. An apparatus as set forth in claim 25 wherein said first roller element is moveable into and out of engagement with said recess.

27. An apparatus as set forth in claim 24 wherein said slide member includes a second recess formed in said exterior surface and spaced from said first recess, said second recess located to interact with another end of said arms.

28. An apparatus as set forth in claim 27 wherein a second roller element engages said arm and said second recess during movement of said slide member causing movement of said arm between said first and second positions.

29. An apparatus as set forth in claim 27 wherein said first roller element is engaged with said first recess when said arm is in said first position and said second roller element is engaged with said second recess when said arm is in said second position.

* * * * *